United States Patent [19]

Helms et al.

[11] 4,238,047
[45] Dec. 9, 1980

[54] COMPOSITE CLOSURE MEMBER

[75] Inventors: Charles R. Helms, Malvern; Donald A. Addison, Chester Spring, both of Pa.

[73] Assignee: Container Corporation of America, Chicago, Ill.

[21] Appl. No.: 31,872

[22] Filed: Oct. 4, 1979

[51] Int. Cl.³ .................. B65D 5/64; B65D 43/00
[52] U.S. Cl. .................................. 220/306; 229/43
[58] Field of Search .................... 229/43, 21, 5.5; 220/306

[56] References Cited

U.S. PATENT DOCUMENTS

| | | | |
|---|---|---|---|
| 3,956,550 | 5/1976 | Sutch | 229/43 X |
| 4,192,434 | 3/1980 | Conroy | 220/306 |

Primary Examiner—George T. Hall
Attorney, Agent, or Firm—Richard W. Carpenter

[57] ABSTRACT

A reusable, composite, container closure having a central panel formed of sheet material and a rim formed of molded thermoplastic material.

1 Claim, 5 Drawing Figures

COMPOSITE CLOSURE MEMBER

SUMMARY OF THE INVENTION

This invention relates to reusable closure members of the type used for closing ends of tubular containers such as cartons or cans.

The particular invention is directed to a composite closure member, of the type disclosed in U.S. Pat. No. 3,956,550, comprising a continuous, molded plastic rim and a central panel of sheet material such as paperboard having a marginal portion bonded to the rim by the material of which the rim is formed. In view of the fact that the central panel of a composite closure of the type described is formed of relatively thin sheet material, after several applications to a container there may be a tendency for it to develop unsightly creases or wrinkles.

It is therefore an object of the invention to provide a composite closure member of the type described which will resist wrinkling upon continual reuse so as to remain attractive.

A more specific object of the invention is to provide, in a closure member of the type described, a means for controlling the contour of the peripheral or marginal portion of the central panel by providing a plurality of radial flutes or ridges and grooves, the latter of which are filled in with the material of which the rim is formed.

These and other objects of the invention will be apparent from an examination of the following description and drawings.

THE DRAWINGS

Figure 1:
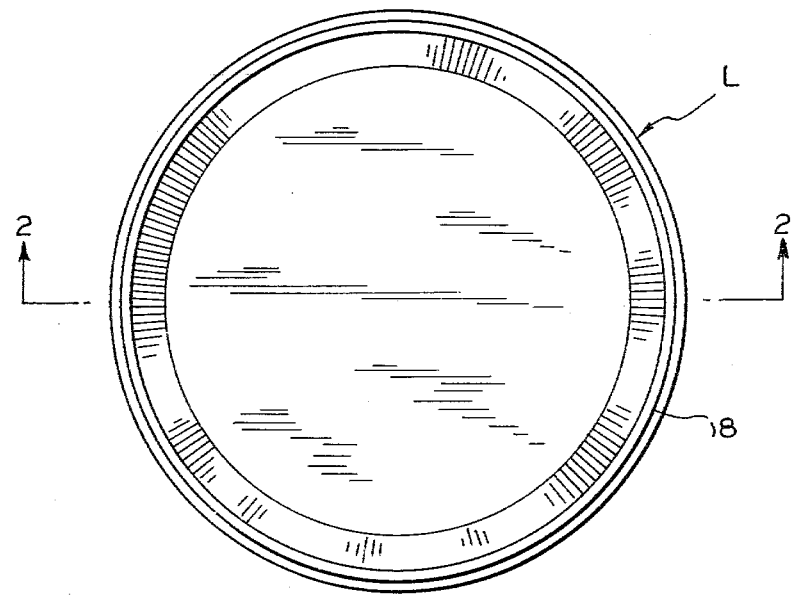
FIG. 1 is a plan view of a composite closure member embodying features of the invention.

It will be understood that, for purposes of clarity, certain elements may have been intentionally omitted from certain views where they are believed to be illustrated to better advantage in other views.

THE DESCRIPTION

Referring now to the drawings for a better understanding of the invention, it will be seen that the composite closure member embodying features of the invention comprises a continuous rim, indicated generally at R, formed of an injection molded thermoplastic material, and a central panel, indicated generally at P, formed of relatively thin sheet material such as paperboard.

Figure 2:
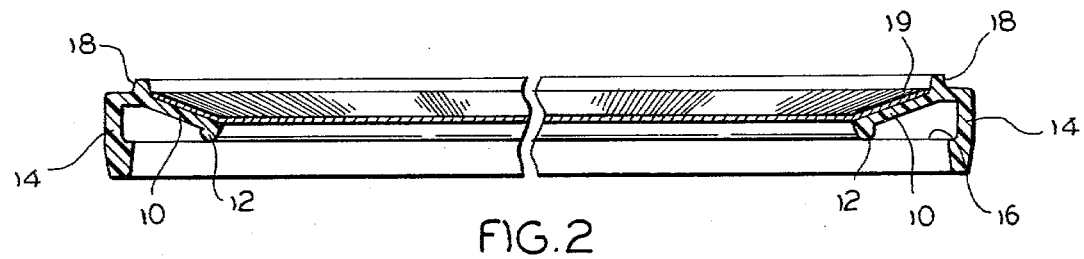
FIG. 2 is a vertical section taken on line 2—2 of FIG. 1.
Figure 3:
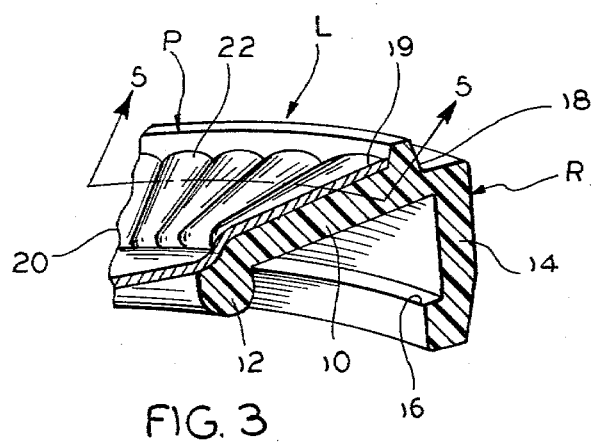
FIG. 3 is a fragmentary, perspective view, partially in vertical section taken through the center of a flute in the panel.
Figure 4:
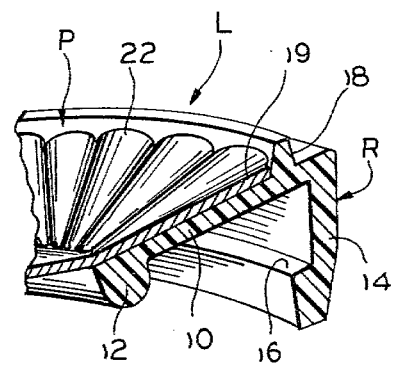
FIG. 4 is a view similar to that of FIG. 3, but taken between two adjacent flutes.
Figure 5:
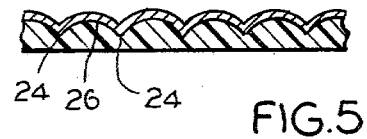
FIG. 5 is a fragmentary, vertical section taken on line 5—5 of FIG. 4.

As best seen in FIGS. 2-4, rim R is shown in circular form, although it may be oval, rectangular or of any other desired shape. Rim R includes a laterally disposed ledge portion or shelf 10 which in the preferred embodiment is inclined downwardly and radially inwardly, although the direction and angle of the slope may be modified as appropriate for the particular contour desired for the closure.

Formed integrally with and depending from shelf 10 is an inner bead 12 and an outer wall or skirt 14 which, together with the underside of shelf 10, define a channel for receiving an upper marginal portion of the wall of a container body (not shown). If desired, skirt 14 may be provided with an inwardly projecting retaining shoulder 16.

Also formed integrally with and extending upwardly from shelf 10 is an outer wall or flange 18 which, together with the adjacent upper surface of shelf 10, defines a recess 19.

As best seen in FIGS. 1 and 2, central panel P is formed from a blank of relatively thin, generally flexible sheet material such as paperboard and includes a center portion 20 and a peripheral or marginal portion 22 which is positioned within rim shelf recess 19 and bonded thereto by the material of which the rim is formed. In the preferred embodiment, marginal portion 22 is flared outwardly and upwardly from center portion 20. As with the case of rim R, the exact angle and/or direction of the slope of flare of panel marginal portion 22 is not essential to the invention.

In order to prevent the panel from developing unsightly wrinkles or creases which may develop upon reuse of the closure, in view of the light weight and flexibility of central panel P, the invention provides a novel construction therefor.

This is accomplished by fluting panel marginal portion 22 to provide a plurality of closely circumferentially spaced, radially extending, alternately disposed ridges 24 and grooves 26.

In the formation of the closure member, central panel P is placed within an injection mold, so that when the rim R is molded, marginal portion 22 of panel P is bonded to rim R by the material of which the rim is formed, with part of the material being received within grooves 26 of the panel marginal portion.

When the rim R is molded, the ridges 24 and the grooves 26 are formed into the periferal edge 22 by the pressure of the resin forcing the edge 22 into a fluted contour in the cavity of the mold.

We claim:

1. In a reusable, composite container closure member, the combination of:
   (a) a continuous rim formed from an injection molded, thermoplastic material and comprising:
      (i) a laterally disposed shelf;
      (ii) a skirt depending from said shelf for engagement with a wall of a container body;
      (iii) a recess;
   (b) a central panel, formed from a blank of generally flexible sheet material such as paperboard, and having a fluted marginal portion presenting a plurality of circumferential spaced, radially extending, alternately disposed ridges and grooves;
   (c) said panel marginal portion being disposed within the recess of said rim and bonded thereto by the material of said rim with part of said material received in the grooves of said marginal portion.

* * * * *